(12) United States Patent
Adzima et al.

(10) Patent No.: US 6,551,707 B1
(45) Date of Patent: Apr. 22, 2003

(54) MIXED LUBRICANT SIZING

(75) Inventors: Leonard Joseph Adzima, Pickerington, OH (US); Robert Arthur Schweizer, Granville, OH (US); Arthur Eloy Lopez, Amarillo, TX (US); Donald Burton Sage, Jr., Amarillo, TX (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 286 days.

(21) Appl. No.: 09/676,639

(22) Filed: Sep. 30, 2000

Related U.S. Application Data

(63) Continuation-in-part of application No. 09/182,462, filed on Oct. 30, 1998, now Pat. No. 6,228,281.

(51) Int. Cl.[7] .......................... B32B 27/02; B32B 25/02
(52) U.S. Cl. ..................... 428/394; 428/391; 428/392
(58) Field of Search ................................ 524/156, 261; 525/29, 101; 428/375, 378, 391, 392, 394

(56) References Cited

U.S. PATENT DOCUMENTS

| | | | |
|---|---|---|---|
| 4,244,844 A | * | 1/1981 | Molinier et al. ............ 428/391 |
| 4,246,145 A | * | 1/1981 | Molinier et al. ............ 428/391 |
| 4,609,591 A | | 9/1986 | Pollet et al. |
| 4,659,752 A | | 4/1987 | Piret |
| 4,983,647 A | | 1/1991 | Ueno et al. |
| 5,514,745 A | | 5/1996 | Yoshino |
| 5,643,989 A | | 7/1997 | Van De Grampel et al. |
| 5,648,169 A | | 7/1997 | Thimons et al. |
| 5,665,470 A | | 9/1997 | Key et al. |

FOREIGN PATENT DOCUMENTS

| | | |
|---|---|---|
| DE | 286 263 | 1/1991 |
| JP | 57 111265 | 7/1982 |
| WO | WO 00 26155 | 5/2000 |

* cited by examiner

*Primary Examiner*—David W. Wu
*Assistant Examiner*—Robert D. Harlan
(74) *Attorney, Agent, or Firm*—Inger H. Eckert; Stephen W. Barns

(57) ABSTRACT

The present invention relates to pellets comprising fibers impregnated with resin. The pellets incorporate a mixed lubricant sizing composition comprising at least one cationic lubricant and at least one non-ionic lubricant. These pellets may be consolidated to form fiber reinforced resin composites.

12 Claims, No Drawings

MIXED LUBRICANT SIZING

This application is a CIP of U.S. Pat. No. 09/182,462, filed Oct. 30, 1998 now U.S. Pat. No. 6,228,281.

FIELD OF THE INVENTION

The present invention relates to pellets comprising fibers impregnated with resin. The pellets incorporate a mixed lubricant sizing composition comprising at least one cationic lubricant and at least one non-ionic lubricant. These pellets may be consolidated to form fiber reinforced resin composites.

BACKGROUND OF THE INVENTION

Fibrous strands comprising a plurality of individual fiber filaments have been used, both in continuous or chopped form, to impart improved material properties to reinforced composites such as tensile strength, percent elongation, flexural modulus, impact strength, and deflection temperature under load. Reinforced composites are useful in various applications such as injection moldable automotive parts.

One method of making reinforced composites is by mixing fibrous strand choppings, usually glass strand choppings, with a molten synthetic resin in an extruder and injecting the mixture into a mold. A major draw back to this method is the high shear stress placed on the fibers of the chopped strand causing the fibers to be comminuted into shorter segments. These shortened fibers impart reduced material properties to a reinforced composite when compared to longer fibers.

An alternative to the direct mixing of chopped strand with synthetic resins involves drawing a grass strand though an die to impregnate a continuous strand with a polyolefin resin. The impregnated strand may then be chopped into pellets. These pellets may be used by themselves or mixed with additional resin to make a reinforced composite. In either case, this method greatly reduces or eliminates the shortening of glass fibers and yields composites with more desirable properties. Unfortunately, this method does impart some physical stress to the fiber strand.

Undesirable physical damage such as fracture may be done to the individual filaments which make up a strand as the strand is pulled through an impregnation, die. Additionally, filament fracture may also occur as the strand is usually drawn over a breaker bar which splays the individually fibers to increase the amount of resin which may be impregnated on the strand. This fracture or breakage of the individual filaments leads to a frayed or fuzzy looking strand surface and is often referred to "fuzzing."

Fuzzing is the result of abrasion of the strand as it is drawn over the breaker bar or through the impregnation die. Not only does fuzzing lead to undesirable properties in a reinforced polyolefin composite, fuzzing may also cause the impregnation die to become clogged causing undesirable interruptions during manufacture. Fuzzing also limits the speed at which impregnated stands can be manufacture because as the strand is drawn across the breaker bar and impregnation die at faster speeds the likelihood of fuzzing increases. Fuzzing also appears to propagate additional filament fracture leading to additional fuzzing and the complete fracture of the strand.

Several lubricants have been used in sizing compositions to reduce fuzzing. Unfortunately, high levels of lubricants are often needed to reduce fuzzing. When the ultimate use of a sized strand is to reinforce a synthetic resin, lubricants are often incompatible with the resin and therefore lubricant content should be minimized as mush as possible. Accordingly, it would be desirable to discover a sizing wherein the amount of lubricants is minimized.

It has now surprisingly found that a mixed lubricant system comprising at least one cationic lubricant and at least one non-ionic lubricant greatly reduces fuzzing. Additionally, it has been found that a cationic lubricant and a non-ionic lubricant work in synergy to reduce fuzzing. Furthermore, it has been found that because of the synergistic relationship, the amount of lubricant present in a sizing may be minimized while still reducing or preventing fuzzing. The present invention is particularly useful in the manufacture of impregnated strands because the impregnation process involves many points of abrasive contact and a higher potential for fuzzing.

SUMMARY OF THE INVENTION

An object of the present invention is a sizing composition useful to prevent fuzzing comprising a cationic lubricant and a non-ionic lubricant and is hereafter referred to as "mixed lubricant sizing."

Another object of the invention is a strand which incorporates the mixed lubricant sizing and is hereafter referred to as "mixed lubricant strand." The mixed lubricant strand is preferably made by the application of the mixed lubricant sizing to a plurality of individual fiber filaments which are then gathered into a strand.

Another object of the invention are pellets which incorporate the mixed lubricant sizing and is hereafter referred to as "mixed lubricant pellets" The mixed lubricant pellets are preferably made by impregnating the mixed lubricant strand with a synthetic resin, cooling to form an impregnated strand, and chopping the impregnated strand to form the mixed lubricant pellets.

Yet another object of the invention is a reinforced resin composite incorporating the mixed lubricant sizing and is hereafter referred to as "mixed lubricant composite." The mixed lubricant composite comprises a fiber reinforcing material dispersed in a synthetic resin matrix. The mixed lubricant composite is preferably made by directly consolidating the mixed lubricant pellets.

DETAILED DESCRIPTION OF THE INVENTION

Mixed Lubricant Sizing

The mixed lubricant sizing of the present invention comprises at least one cationic lubricant and at least one non-ionic lubricant. The mixed lubricant sizing may be an aqueous or non-aqueous based sizing but is preferably an aqueous based sizing. The mixed lubricant sizing may further comprise any additional components that are well known in the art for use in sizings, and preferably for use in sizings for glass fibers. For example, the mixed lubricant sizing may further comprise one of more of coupling agents, pH modifiers, lubricants, film formers, and stabilizers.

Any cationic lubricant known for use in sizings may used in the mixed lubricant sizing of the present invention. The cationic lubricant is preferably present in an amount ranging from 0.001 to 0.5 total wt. % solids of the mixed lubricant sizing, more preferably from 0.03 to 0.2 wt. %, and most preferably from 0.05 to 0.1 wt. %.

Particularly preferred cationic lubricants are those selected from the group consisting of partially amidated long-chain polyalkylene imines. The partially amidated polyalkylene imines usually have a residual amine value of from about 200 to about 800 and are reaction products of a mixture of about C2 to about C18 fatty acids with a polyethylene imine having a molecular weight from about 800 to about 50,000. The amines suitable for forming the fatty acid salt of this reaction product are preferably tertiary amines of substantially low molecular weight, for example with the alkyl groups attached to the nitrogen atom having from about 1 to about 6 carbons. Preferably, the fatty acid moiety of the salt preferably includes from about 12 to about 22 carbon atoms. Most preferably, the partially amidated polyalkylene imine is a condensation reaction product of polyethylene imine with a fatty acid selected from the group consisting of pelargonic and caprylic acids, which for example is commercially available from Henkel Inc. under the trademark EMERY 6760T.

Any non-ionic lubricant known for use in sizings may used in the mixed lubricant sizing of the present invention. The non-ionic lubricant is preferably present in an amount ranging from 0.5 to 2.5 total wt. % solids of the mixed lubricant sizing, more preferably from 0.9 to 1.5 wt. %, and most preferably from 1.1 to 1.3 wt. %.

A preferred non-ionic lubricant is a polyoxyalkylated polyalkylene glycol ester, such as a fatty acid monoester. Preferably, the nonionic lubricant of this invention is an alkoxylated polyethylene glycol fatty acid ester. An example of a preferred ester is an ethoxylated polyethylene glycol fatty acid monoester. A particularly preferred nonionic lubricant is a mono-oleate ester having about 400 ethylene oxide groups, marketed commercially as PEG 400 MO, PEG400 MIS, and PEG400 MS by Henkel Chemicals.

Preferably the sizing compositions of the present invention further comprise at least one coupling agent. The coupling agents preferably used in this invention have hydrolyzable groups that can react with the glass surface to remove unwanted hydroxyl groups; and one or more groups that can react with the film-forming polymer to chemically link the polymer with the glass surface. Preferably, the coupling agent is one that has 1–3 hydrolyzable functional groups that can interact with the surface of the glass fibers, and one or more organic groups that are compatible with the polymer matrix. The preferred coupling agents of this invention include compounds selected from the group consisting of organosilanes. Examples of hydrolyzable groups associated with these organosilanes include vinylic, amino and imino groups. Particularly preferred organo functional silane coupling agents for the practice of this invention include vinylic silanes, which are useful in unsaturated resins; and amino silanes, which are useful promoters or coupling agents for resins such as epoxies, phenolics, melamines, nylons, acrylics, PVC, polyolefins, polyurethanes and nitrile rubbers. In one preferred embodiment, the organosilane ingredient is an amino silane, most preferably gamma-aminopropyltriethoxysilane (A-1100). A-1100 is commercially available, for example from Crompton Corp.

In addition to a coupling agent, the sizing composition further comprises a modified polypropylene capable of reacting with the coupling agent and increases the wetability of fibers when they are impregnated with a polypropylene resin. The modified polypropylene is preferably a maleated polypropylene, most preferably 43N40 commercially available from Chemcor. Other suitable modified polypropylenes are those polypropylenes modified with acrylic acid.

Mixed Lubricant Strands

The mixed lubricant stands of the present invention are made by applying the mixed lubricant sizing by any method known to those skilled in the art. In the preferred embodiment, the mixed lubricant sizing is applied to glass fibers after they have been attenuated from a fiber-forming bushing. Fibers exiting the bushing may be passed through a coating apparatus where the sizing treatment is applied, or the mixed lubricant sizing may otherwise be contacted with the fibers according to methods familiar to one skilled in the art. For example, the mixed lubricant sizing may be applied to the surface of the fibers by spraying, dipping, roll-coating, or other coating means known in the art. After the mixed lubricant sizing is applied, the fibers may be gathered into strands or rovings and wound to build a forming package.

As one means of building the forming package, glass fibers attenuated from the fiber-forming bushing are combined into one or more strands as they are turned onto or passed through a gathering apparatus. A winder located below the gathering apparatus simultaneously collects the strands onto a rotating collet. The strands are thus formed into a cylindrical forming package. The rate of attenuation of the fibers and the rate of winding can be controlled so as to create a uniformly wound package having a desirable size. The winding operation may also be modified such that more than one forming package can be wound at the same time from the strands attenuating from the bushing.

Mixed Lubricant Pellets

The mixed lubricant pellets of the present invention are made by impregnating the mixed lubricant strands with a molten resin, preferable a polypropylene resin, most preferably an unmodified polypropylene. Impregnation may be performed by any method known to those skilled in the art. After the mixed lubricant strand is impregnated with a molten resin, it is allowed to cool and then chopped into pellets. These pellets may then be consolidated, such as by injection molding, to form a fiber reinforced composite.

EXAMPLE

A mixed lubricant sizing composition was made by mixing the following ingredients:

| Ingredient as Received | wt % |
|---|---|
| A-1100 | 1.50 |
| PEG 400 MO | 1.20 |
| 43N40 | 10.82 |
| Emery 6760T | 0.15 |
| Water | remainder |

The mixed lubricant sizing was then applied to glass fibers to make a mixed lubricant strand which was impregnated with a polypropylene polymer, cooled, and chopped to form mixed lubricant pellets. These pellets were then consolidated into a fiber reinforced composite by injection molding.

We claim:

1. A pellet comprising sized fibers impregnated by a thermoplastic polymer wherein said sized fibers were treated with a sizing composition comprising
    from about 0.01 to about 0.5 percent weight of a cationic lubricant;
    from about 0.5 to about 2.5 percent weight of a non-ionic lubricant;
    from about 1.0 to about 2.0 percent weight of a coupling agent; and
    from about 10 to about 12 percent weight of a modified polypropylene capable of reacting with the coupling agent.

2. The product of claim 1 wherein the cationic lubricant is a condensation reaction product of polyethylene imine with a fatty acid selected from the group consisting of pelargonic and caprylic acids.

3. The product of claim 1 wherein the non-ionic lubricant is an alkoxylated polyethylene glycol fatty acid ester.

4. The product of claim 1 wherein the coupling agent comprises one or more coupling agents selected from a group consisting of vinylic silanes, amino silanes and mixtures thereof.

5. The product of claim 4 wherein the modified polypropylene is modified with an organic acid selected from a group consisting of acrylic acid, maleic acid and mixtures thereof.

6. The product of claim 1 wherein the polymer is polypropylene.

7. A composite comprising fibers dispersed in a polymer matrix wherein, prior to being.dispersed, said fibers were treated with a sizing composition comprising from about 0.01 to about 0.5 percent weight of a cationic lubricant;

from about 0.5 to about 2.5 percent weight of a non-ionic lubricant;

from about 1.0 to about 2.0 percent weight of a coupling agent; and from about 10 to about 12 percent weight of a modified polypropylene capable of reacting with the coupling agent.

8. The product of claim 7 wherein the cationic lubricant is a condensation reaction product of polyethylene imine with a fatty acid selected from the group consisting of pelargonic and caprylic acids.

9. The product of claim 7 wherein the non-ionic lubricant is an alkoxylated polyethylene glycol fatty acid ester.

10. The product of claim 7 wherein the coupling agent comprises one or more coupling agents selected from a group consisting of vinylic silanes, amino silanes and mixtures thereof.

11. The product of claim 10 wherein the modified polypropylene is modified with an organic acid selected from a group consisting of acrylic acid, maleic acid and mixtures thereof.

12. The product of claim 7 wherein the polymer is polypropylene.

* * * * *